United States Patent [19]
Brandner et al.

[11] Patent Number: 6,099,779
[45] Date of Patent: Aug. 8, 2000

[54] PROCESS FOR MANUFACTURE OF A COVER FOR A VEHICLE ROOF

[75] Inventors: Hans Brandner, Dachau; Hans Jardin, Inning, both of Germany

[73] Assignee: Webasto-Schade GmbH, Oberpfaffenhofen, Germany

[21] Appl. No.: 08/154,422

[22] Filed: Nov. 19, 1993

[30] Foreign Application Priority Data

Nov. 19, 1992 [DE] Germany ............................. 42 38 889

[51] Int. Cl.⁷ ................................................ B29C 45/14
[52] U.S. Cl. .......................... 264/242; 264/261; 264/263; 264/264
[58] Field of Search .................................. 264/261, 262, 264/263, 264, 267, 242, 275

[56] References Cited

U.S. PATENT DOCUMENTS

| | | |
|---|---|---|
| 3,026,575 | 3/1962 | Lusher et al. . |
| 3,037,810 | 6/1962 | Kelley . |
| 4,151,696 | 5/1979 | Knights et al. .......................... 264/267 |
| 4,185,439 | 1/1980 | Bischupp et al. ........................ 264/261 |
| 4,259,135 | 3/1981 | Kulla . |
| 4,263,237 | 4/1981 | Weeden et al. . |
| 4,581,089 | 4/1986 | MacMillan . |
| 4,738,482 | 4/1988 | Böhm et al. . |
| 4,834,931 | 5/1989 | Weaver . |
| 4,847,024 | 7/1989 | Loren . |
| 4,909,875 | 3/1990 | Canaud et al. . |
| 4,948,539 | 8/1990 | Byers et al. . |
| 5,069,849 | 12/1991 | Wain . |
| 5,069,852 | 12/1991 | Leone et al. . |
| 5,127,193 | 7/1992 | Okada et al. . |
| 5,129,807 | 7/1992 | Oriez et al. . |
| 5,207,957 | 5/1993 | Heath et al. . |
| 5,344,603 | 9/1994 | Jardin ........................................ 264/275 |

*Primary Examiner*—Angela Ortiz
*Attorney, Agent, or Firm*—Nixon Peabody LLP; David S. Safran

[57] ABSTRACT

A cover unit for a vehicle roof, which can be opened, has a cover plate, a reinforcing frame arranged therebelow, and a seal-receiving frame, injection molded around the outer periphery of the cover plate, the seal-receiving frame having an encircling groove for receiving a peripheral seal at its outer periphery. In a process for the manufacture of a such cover, an inwardly directed part of the peripheral seal directly serves as a core which forms the seal-receiving groove by which it is detachably interlocked with the seal-receiving frame.

6 Claims, 3 Drawing Sheets

PROCESS FOR MANUFACTURE OF A COVER FOR A VEHICLE ROOF

BACKGROUND OF THE INVENTION

1. Field of the Invention

The invention relates to a vehicle roof cover unit, which can be opened, comprising a cover plate, a one-part or multiple-part reinforcing frame, arranged therebelow, and a synthetic material frame, injection molded around the outer periphery of the cover and of the reinforcing frame, which reinforcing frame, on its part, has a groove, encircling its outer periphery, for receiving an edge gap sealing profile. The invention further relates to a process for the manufacture of such a cover.

2. Description of Related Art

A cover unit of this kind, for a vehicle roof, which can be opened, is described in U.S. Pat. No. 4,753,482, where a cover plate and a reinforcing frame disposed therebelow in the peripheral areas are surrounded with a synthetic mass by injection molding, and thereby are interconnected; and where, during the injection molding process, a groove for receiving an edge gap sealing profile is created at the outer periphery. In the groove thus obtained, an encircling edge gap sealing profile is either inserted manually, or, in a further variation, is injected in an additional injection process. Apart from the fact that, after the initial injection process, further process steps are required, a drawback of this cover is that unavoidable minute mold and tolerance deviations in the injection part overlap those occurring in the edge gap sealing profile, and, consequently, do not result in a clearly definable outer contour of the finished cover assembly.

In commonly assigned, co-pending U.S. patent application Ser. No. 07/843,188, now U.S. Pat. No. 5,344,603 a process for the production of a cover unit with a peripheral seal for vehicle roofs is disclosed in which a mold, having a mold cavity with adjoining first and second mold spaces which open into each other, has at least one cover part and a cover support placed therein with an edge area thereof extending into said first mold space, and where a seal-receiving part, having an outwardly directed seal receptacle in which a resiliently compressible peripheral seal is mountable, is arranged in the first mold space at a distance from the cover part and cover support so as to leave a connection-forming gap in the mold between them and the seal-receiving part, the seal-receiving part being positioned so as to isolate the second mold space from the first mold space and being oriented with the seal receptacle facing into the second mold space. The mold is closed and an elastomer introduced into the mold so as to fill the connection-forming gap and connect the cover part and cover support into a unit with the seal-receiving part, the elastomer introduced being made of a softer material than the seal-receiving part and being prevented from entering into said second mold space by said seal-receiving part. A peripheral seal can be molded onto the outer side portions of the seal-receiving part or can be subsequently attached to the completed cover unit.

A method for the manufacture of a sealing gasket on the rim of a sheet of glass is disclosed in U.S. Pat. No. 5,069,852 by which a preformed sealing gasket is fixed to the rim of a sheet of glass by positioning the rim of the glass sheet and the gasket in a mold cavity and molding and polymerizing a polyurethane material onto and between portions of the glass sheet and gasket. However, no attempt is made to mechanically interlock the gasket and polyurethane material in a detachable manner.

SUMMARY OF THE INVENTION

It is the primary objective of the present invention to provide a cover unit, as well as a process for the manufacture of such cover unit, which would further facilitate its manufacture, while achieving exact dimensional accuracy of the outer contour of the cover unit, inclusive of the peripheral seal.

This objective is achieved by the provision of a removable peripheral seal having an edge gap sealing profile with an inwardly directed part that functions as a core which directly forms a seal-receiving groove in the seal-receiving part of the cover unit.

Due to the fact that the peripheral seal, via the inwardly directed part thereof, serves directly as the core that forms the seal-receiving groove in the seal-receiving part of the cover unit, only a single injection process step is require, and it outwardly defines the contour of the injection mass. Accordingly, by the adaptation of the edge gap sealing profile to a mold corresponding to the size of the vehicle roof opening, a well defined outer contour of the completed cover unit is predetermined. The inventive cover can be manufactured with dimensional accuracy in a single injection process and does not require any reworking during installation into the vehicle. There is no need for manual adjustment of the peripheral seal by way of embedded, deformable metallic inserts, as is customary with covers of this kind.

In another advantageous embodiment of the invention, the injection molded seal-receiving frame, and the core-forming molded part of the peripheral seal consist of materials which do not bond during the injection process. As a result, the core-forming molded part can be removed from its self-formed groove in the synthetic frame, when damaged or worn.

The exchangability of the peripheral seal is further enhanced by the fact that the injected molded seal-receiving frame, and/or molded part, have a flexibility which permits removal or exchange.

The injection molded seal-receiving frame, preferably, consists of polyurethane (PU). This material, in addition to displaying good working properties during the injection process, also has excellent dimensional stability and firmness.

It is also advantageous for the core-forming part of the peripheral seal to be formed of ethylene propylene diene terpolymer. This material has sufficient rigidity to securely hold the part in the groove of the injection molded seal-receiving frame, while also being sufficiently flexible to facilitate removal therefrom without damage.

Additionally, extraction and insertion of the molded part with respect to the groove in the seal-receiving frame can be further enhanced by the presence of a cavity in the inwardly directed molded part in the area of the groove.

The inventive process for manufacturing a vehicle roof, which can be opened, comprises the following procedural steps:

The cover plate is placed onto the reinforcing frame, and both parts are placed in the center of the mold, which surrounds it at the outer periphery, at a distance therefrom. In the next step, an encircling peripheral seal is inserted along the inner edge of the mold, while leaving an interspace relative to the cover plate and the reinforcing frame. Thereafter, the mold is closed, and the interspace between the peripheral seal having the inwardly directed molded part, and the cover plate and reinforcing frame has a synthetic plastic material injected therein. Subsequently, the mold is opened and the finished cover unit removed. Accordingly, in a single manufacturing process, a cover of dimensional stability is produced, having well defined dimensions that have been predetermined by the contour of the mold, whose peripheral seal, by its inwardly directed part, is embedded in the seal-receiving frame material, and is removable therefrom.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
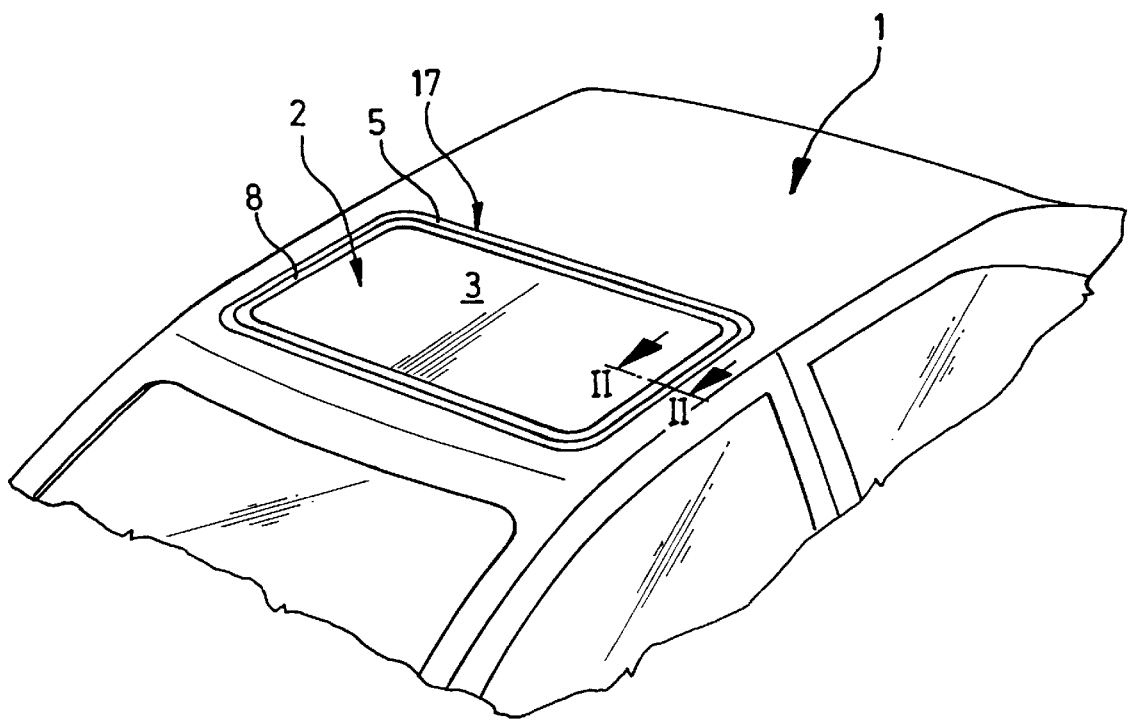
FIG. 1 is a perspective top view onto a vehicle roof.

A roof opening, designated with reference numeral 17, is provided in a rigid vehicle roof 1, which opening can be closed by a cover unit, designated as a whole, with reference numeral 2, and can, at least partially, be opened by raising of its front or rear edges, and/or by sliding of the cover by any of various means that are well known in the art. This cover unit 2 is comprised of a cover plate 3, which, preferably, is made of a light transmissive material like glass, a one-part or multi-part reinforcement frame 4 arranged therebelow, and a seal-receiving frame 8 connected to the cover plate 3 and reinforcing frame 4 by injection molding. The reinforcing frame 4 can also be replaced by individual profile members which are not directly interconnected. At its outwardly directed edge, seal-receiving frame 8 has a groove 7 for receiving an edge gap sealing profile 5. To the extent described so far, the cover unit 2 is similar to that of the initially mentioned patent and patent application.

Figure 2:
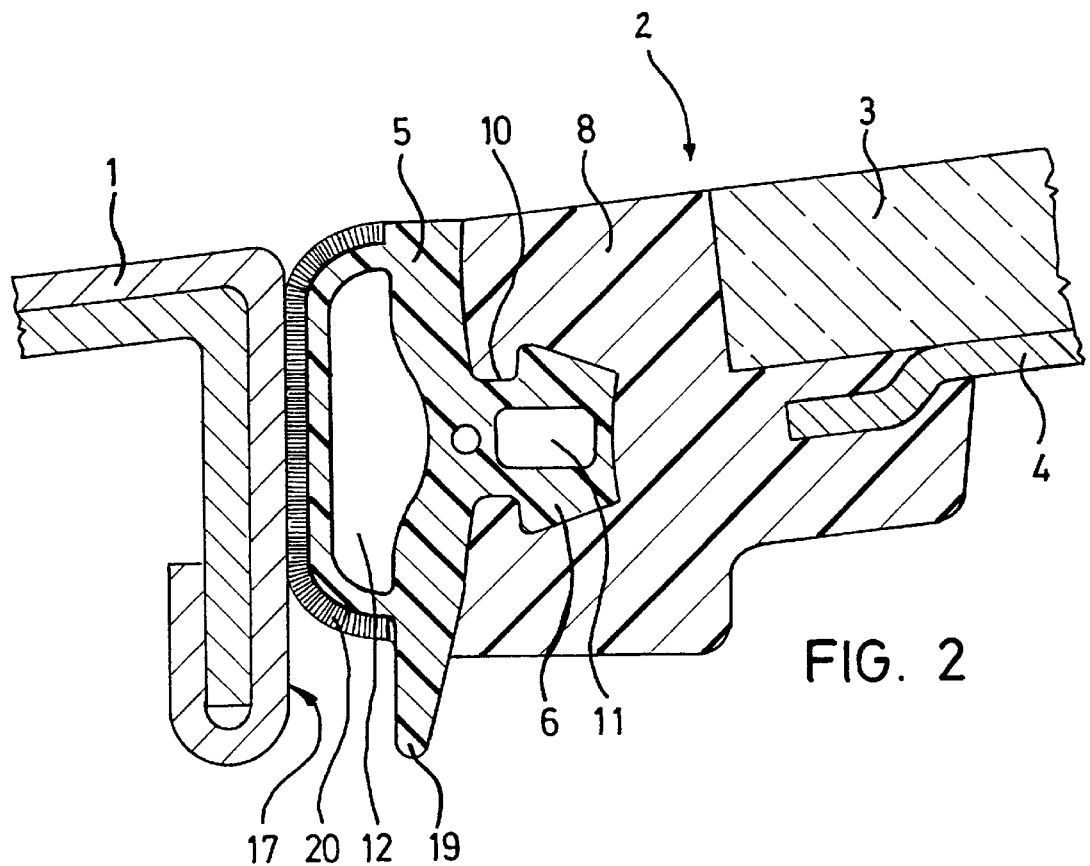
FIG. 2 is a sectional view through the edge portion of the roof taken along line II—II in FIG. 1.
Figure 4:
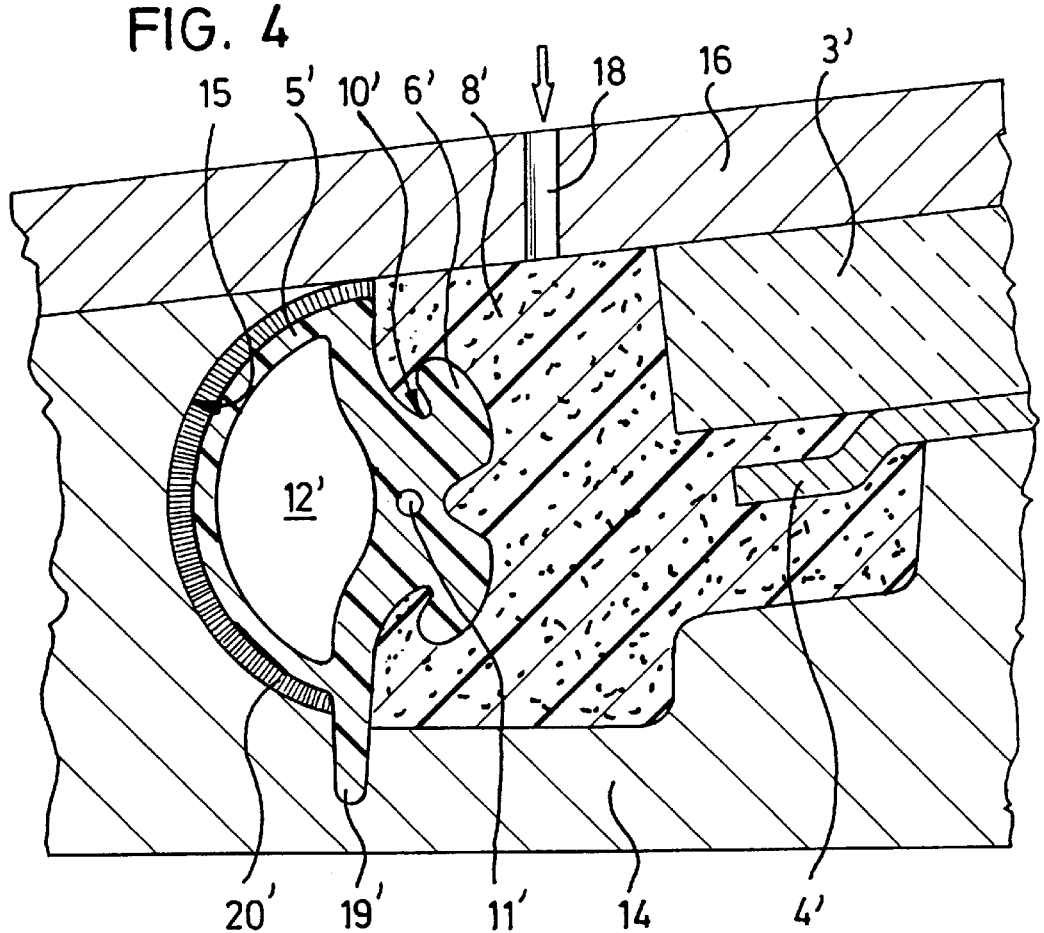
FIG. 4 is a cover unit with an inwardly directed core-forming part and seal-receiving groove that are differently shaped from those illustrated in FIGS. 2 and 3, shown in a mold for the manufacturing thereof.

However, as is shown in FIGS. 2 and 4, in accordance with the present invention, the peripheral seal 5 engages groove 7 of seal-receiving frame 8 by means of an inwardly directed, i.e. oriented towards cover plate 3, part 6. The inwardly directed part 6 has two opposite undercuts 10 which cooperate with two projections 9 of frame 8 which have a complementary shape. In such a way, the peripheral seal 5 is firmly retained by frame 8 and can only be removed by an outward, horizontal extraction by the matched shape of the inwardly directed part 6 with respect to groove 7 and projections 9 of the frame 8, which serves an additional function as is described below.

Figure 3:
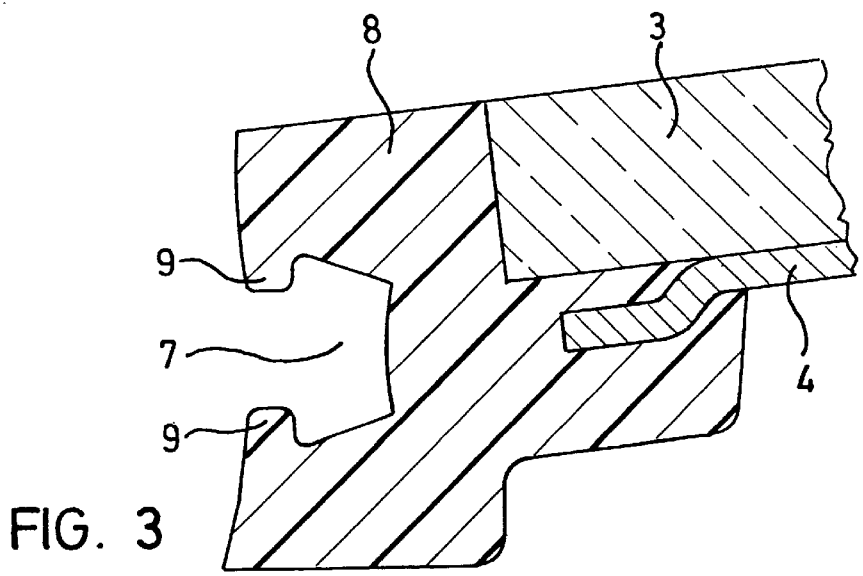
FIG. 3 is a cross-sectional view of the edge portion of the cover unit in accordance with FIG. 2, with the peripheral seal removed.
Figure 5:
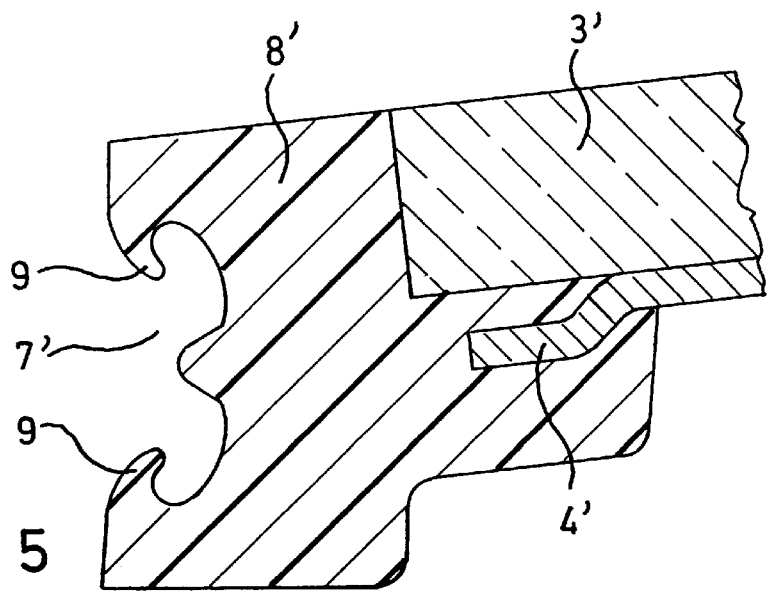
FIG. 5 is a view corresponding to that of FIG. 3, but showing the cover unit of FIG. 4.

In FIG. 4, parts that correspond to those depicted in FIGS. 2 and 3 are designated with identical reference numerals plus a prime symbol ('). Thus, it will be apparent how the following description of the method of manufacture applies not only to the cover unit of FIGS. 4 & 5, but also to that of FIGS. 2 and 3.

In the manufacture of the inventive cover unit, a reinforcing frame 4' and a superimposed cover plate 3' are inserted into the center of a lower mold part 14, and edge gap sealing peripheral seal 5' is applied and fixed at the inner edge 15 of the lower mold part 14 with an interspace being formed between the peripheral seal 5' and both the cover plate 3' and the reinforcing frame 4'. In the example shown, a fixed position of the peripheral seal 5' relative to the lower mold part 14 is ensured by insertion of a downwardly directed lip 19' of the peripheral seal 5', into a correspondingly formed cavity in lower mold part 14. Alternatively, in the area of inner edge 15 of the lower mold part, several small suction openings can be arranged which are connected to a suction source outside the mold to facilitate holding of the sealing profile of the seal 5' against the inner edge 15 of lower mold part 14. Subsequently, an upper mold part 16 is sealingly pressed against lower mold part 14, with mold part 16 having several peripherally distributed injection openings 18 through which a synthetic plastic material can be injected under pressure for the manufacture of the seal-receiving frame 8'. To this end, inwardly directed part 6' functions as a core for forming the groove 7', depicted in FIG. 5, which becomes visible upon removal of the edge gap sealing profile 5. After hardening of the synthetic mass, seal-receiving frame 8 connects cover plate 3 with reinforcing frame 4 and detachably mounts the peripheral seal 5' in its groove 7'.

Molded part 6, 6', and synthetic frame 8, 8', preferably are made of materials which will not bond to each other during the injection molding process. To this end, suitable materials for frame 8, 8' are polyurethane (PU), and for inwardly directed part 6, 6', ethylene propylene diene terpolymer (EPDM). Removal of the peripheral seal 5 from the seal-receiving frame 8, 8' when the seal becomes damaged or worn, for instance, is additionally facilitated by the flexible, resilient design of either inwardly directed part 6 and/or projections 9 of the seal-receiving frame 8, 8'. Additionally, extraction and insertion of inwardly directed part 6, 6' with respect to groove 7, 7' is enhanced by the provision of a cavity 11, centrally within the molded part 6, 6' which permits a temporary compression of the inwardly directed part 6, 6'. For better adaptation to the contour of roof opening 17, the peripheral seal 5, 5' has edge gap sealing profile which, preferably, in conventional manner, has hollow space 12, i.e., the seal is a so-called cavity seal. Of course, it will be appreciated that the pressure at which the material for seal-receiving frame 8, 8' is injected into the mold will be coordinated to the stiffness of the peripheral seal (taking into consideration the affect of any cavities 11, 12 that may be provided) to insure that neither the inwardly directed part 6 nor the edge gap sealing profile of the peripheral seal 5 are collapsed or compressed by the injection molding of the seal-receiving frame 8, 8'.

The manufacturing process, specifically illustrated in FIG. 4, ensures that the outer contour of the completed cover unit 2, 2' exactly conforms to the contour of the roof opening 17 in vehicle roof 1. This is achieved by the sealing profile of peripheral seal 5, 5', defining the outer edge of the completed cover unit 2, 2', exactly adapting to the inner edge 15 of the precision worked lower mold part 14. Any possible manufacture induced dimensional variations in cover plate 3, 3' or peripheral seal 5, 5' are compensated for by the interspace of flexible width between these two parts, in which the seal-receiving frame 8, 8' is created by injection molding. A flocking 20, 20' is provided at the outer edge of edge gap sealing profile of seal 5, 5' for enhancing its utility and appearance.

The inventive cover can easily be manufactured in a single processing operation, and the fact that the outer edge gap sealing profile exactly adapts to the mold during manufacture results in an exact outer dimension. The manufacturing process with its single injection molding operation provides a substantial cost reduction, and any reworking during installation, usually required for adjusting the gap at the edge gap sealing profile of the peripheral seal in connection with covers of this kind, is completely eliminated.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Process for the manufacture of a cover unit of a vehicle roof, which can be opened, and which has a cover plate, a reinforcing frame arranged therebelow, and a rigid seal-receiving frame injection molded around an outer periphery of the cover plate and reinforcing frame, the seal-receiving frame having an encircling groove on an outer periphery thereof for receiving a resiliently deformable peripheral seal, comprising the steps of:

a. placing the cover plate onto the reinforcing frame and placing the cover plate and the reinforcing frame into the center of a mold so that the mold peripherally surrounds the reinforcing frame and cover plate at a distance therefrom;

b. inserting said resiliently deformable peripheral seal into the mold so that an encircling edge gap sealing profile of the seal extends along an inner edge of the mold while leaving an interspace between peripheral seal and both the cover plate and reinforcing frame;

c. closing the mold and injecting a synthetic plastic material into the interspace so as to mold the rigid seal-receiving frame connecting the cover plate and reinforcing frame and simultaneously forming said encircling groove in the seal-receiving frame by surrounding an inwardly directed part of the peripheral seal with said plastic material and using said inwardly directed part as a core for directly forming said encircling groove in the seal-receiving frame; and d. opening the mold and removing a finished cover unit.

2. Process for the manufacture of a cover unit of a vehicle roof according to claim 1, wherein the injecting step is performed using a material for the rigid seal-receiving frame which will not bond with the material of which the inwardly directed part is formed during molding thereof, thereby facilitating separation of the resiliently deformable peripheral seal from the rigid seal-receiving frame after the cover unit is finished.

3. Process for the manufacture of a cover unit of a vehicle roof according to claim 2, wherein the material for the seal-receiving frame is polyurethane.

4. Process for the manufacture of a cover unit of a vehicle roof according to claim 3, wherein the inwardly directed part is made of ethylene propylene diene terpolymer.

5. Process for the manufacture of a cover unit of a vehicle roof according to claim 2, wherein the material for the seal-receiving frame is one which will not bond with ethylene propylene diene terpolymer of which the inwardly directed part is made.

6. Process for the manufacture of a cover unit of a vehicle roof according to claim 1, wherein the peripheral seal is positionally fixed relative to the mold during said inserting step by insertion of a downwardly directed lip of the peripheral seal into a correspondingly formed cavity in the mold.

* * * * *